(12) United States Patent
Devarakonda

(10) Patent No.: US 9,435,246 B2
(45) Date of Patent: Sep. 6, 2016

(54) ON-BOARD CATALYST HEALTH MONITORING AND CONTROL SYSTEM ADAPTATION IN INTERNAL COMBUSTION ENGINES

(71) Applicant: General Electric Company, Schenectady, NY (US)

(72) Inventor: Maruthi Narasinga Rao Devarakonda, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 14/083,823

(22) Filed: Nov. 19, 2013

(65) Prior Publication Data

US 2015/0139860 A1    May 21, 2015

(51) Int. Cl.
*G01N 30/96* (2006.01)
*G01N 7/00* (2006.01)
*G01N 21/00* (2006.01)
(Continued)

(52) U.S. Cl.
CPC ............. *F01N 11/007* (2013.01); *F01N 3/101* (2013.01); *F01N 3/2066* (2013.01); *F01N 9/00* (2013.01); *F01N 11/00* (2013.01); *F01N 2550/02* (2013.01); *F01N 2560/021* (2013.01); *F01N 2560/022* (2013.01); *F01N 2560/025* (2013.01); *F01N 2560/026* (2013.01); *F01N 2900/1614* (2013.01); *F01N 2900/1624* (2013.01);

(58) Field of Classification Search
CPC ........ G01N 30/96; G01N 7/00; G01N 21/00; G01N 27/00; G01N 31/00; G01N 33/00

USPC ............... 422/83, 88; 436/43, 106, 108, 116
See application file for complete search history.

(56) References Cited

U.S. PATENT DOCUMENTS 3,969,932 A    7/1976    Rieger et al.
5,119,628 A    6/1992    Uema et al.
(Continued)

FOREIGN PATENT DOCUMENTS

EP    2133526 A1    12/2009
WO    2010096793 A2    8/2010
WO    2011093771 A1    8/2011

OTHER PUBLICATIONS

European Search Report and Opinion issued in connection with corresponding EP Application No. 14193523.9 on Apr. 8, 2015.

*Primary Examiner* — Brian J Sines
(74) *Attorney, Agent, or Firm* — Ernest G. Cusick; Hoffman Warnick LLC

(57) ABSTRACT

Various embodiments include systems adapted to monitor catalyst deterioration. Some embodiments include a catalyst deterioration detection system including a pre-catalytic converter gas sensor, a post-catalytic converter gas sensor, at least one computing device in communication with the pre-catalytic converter and post-catalytic converter gas sensors, the at least one computing device configured to monitor catalyst deterioration by performing actions including estimating a catalyst gas storage level by comparing a difference between a pre-catalytic converter gas level from the pre-catalytic converter gas sensor and a post-catalytic converter gas level from the post-catalytic converter gas sensor, comparing the estimated catalyst gas storage level to a baseline catalyst gas storage level and determining that the catalyst is deteriorated in response to the baseline catalyst gas storage level exceeding the estimated gas storage level by a threshold difference.

13 Claims, 3 Drawing Sheets

(51) Int. Cl.
  *G01N 27/00* (2006.01)
  *G01N 31/00* (2006.01)
  *G01N 33/00* (2006.01)
  *F01N 11/00* (2006.01)
  *F01N 3/10* (2006.01)
  *F01N 3/20* (2006.01)
  *F01N 9/00* (2006.01)

(56) References Cited

U.S. PATENT DOCUMENTS

| | | |
|---|---|---|
| 5,220,788 A | 6/1993 | Kurita et al. |
| 5,396,766 A | 3/1995 | Sato et al. |
| 5,644,912 A | 7/1997 | Kawamura |
| 5,956,940 A | 9/1999 | Manaka |
| 6,550,236 B1 | 4/2003 | Schnaibel et al. |
| 6,736,120 B2 * | 5/2004 | Surnilla ............... 123/674 |
| 6,804,951 B2 | 10/2004 | Nader et al. |
| 6,810,659 B1 * | 11/2004 | Bidner et al. ............ 60/277 |
| 6,860,100 B1 * | 3/2005 | Bidner et al. ............ 60/277 |
| 7,536,851 B2 * | 5/2009 | Mc Lain ................. 60/277 |
| 2006/0224283 A1 | 10/2006 | Fussey et al. |
| 2007/0017212 A1 | 1/2007 | Yamauchi et al. |
| 2008/0173008 A1 | 7/2008 | Kidokoro et al. |
| 2010/0146936 A1 | 6/2010 | Sawada |
| 2013/0245919 A1 | 9/2013 | Kumar et al. |

* cited by examiner

ON-BOARD CATALYST HEALTH MONITORING AND CONTROL SYSTEM ADAPTATION IN INTERNAL COMBUSTION ENGINES

FIELD OF THE INVENTION

The subject matter disclosed herein relates generally to combustion engine catalysts. More specifically, the disclosure provided herein relates to detection of combustion engine catalyst deterioration.

BACKGROUND OF THE INVENTION

In internal combustion engines, catalyst aging and deterioration is a serious concern. Such degradation may cause engines to fall out of emissions compliance. Conventional catalyst maintenance includes periodic replacement of the catalyst or the catalytic converter after a given period of time. Periodic replacement may be costly and wasteful in cases where the catalyst may have useful life remaining.

Attempts have been made to monitor catalyst deterioration in order to determine when a catalyst is no longer useful. Such conventional attempts to monitor combustion engine catalyst deterioration have strictly been based on comparing time lag between signals from upstream and downstream oxygen sensors such as lambda sensors.

BRIEF DESCRIPTION OF THE INVENTION

Various embodiments include systems adapted to monitor catalyst deterioration. Some embodiments include a catalyst deterioration detection system including a pre-catalytic converter gas sensor, a post-catalytic converter gas sensor, at least one computing device in communication with the pre-catalytic converter and post-catalytic converter gas sensors, the at least one computing device configured to monitor catalyst deterioration by performing actions including estimating a catalyst gas storage level by comparing a difference between a pre-catalytic converter gas level from the pre-catalytic converter gas sensor and a post-catalytic converter gas level from the post-catalytic converter gas sensor, comparing the estimated catalyst gas storage level to a baseline catalyst gas storage level and determining that the catalyst is deteriorated in response to the baseline catalyst gas storage level exceeding the estimated gas storage level by a threshold difference.

A first aspect provides a catalyst deterioration detection system comprising: a pre-catalytic converter gas sensor; a post-catalytic converter gas sensor; at least one computing device in communication with the pre-catalytic converter and post-catalytic converter gas sensors, the at least one computing device configured to monitor catalyst deterioration by performing actions including: estimating a catalyst gas storage level by comparing a difference between a pre-catalytic converter gas level from the pre-catalytic converter gas sensor and a post-catalytic converter gas level from the post-catalytic converter gas sensor; comparing the estimated catalyst gas storage level to a baseline catalyst gas storage level; and determining that the catalyst is deteriorated in response to the baseline catalyst gas storage level exceeding the estimated gas storage level by a threshold difference.

A second aspect provides a computer program product comprising program code embodied in a computer readable storage medium, which when executed by at least one computing device, causes the at least one computing device to monitor catalyst deterioration by performing actions including: estimating a catalyst gas storage level by comparing a difference between a pre-catalytic converter gas level and a post-catalytic converter gas level; determining a catalyst deterioration level by comparing the estimated catalyst gas storage level to a baseline catalyst gas storage level; and determining that the catalyst is deteriorated in response to the baseline catalyst gas storage level exceeding the estimated gas storage level by a threshold difference.

A third aspect provides a catalyst deterioration detection system comprising: a catalytic converter for positioning within an exhaust path of an internal combustion engine; a pre-catalytic converter gas sensor disposed within the exhaust path upstream of the catalytic converter; a post-catalytic converter gas sensor disposed within the exhaust path downstream of the catalytic converter; at least one computing device communicatively coupled with pre-catalytic converter and post-catalytic converter gas sensors, the at least one computing device configured to monitor catalyst deterioration by performing actions including: estimating a catalyst gas storage level by comparing a difference between a pre-catalytic converter gas level from the pre-catalytic converter gas sensor and a post-catalytic converter gas level from the post-catalytic converter gas sensor; comparing the estimated catalyst gas storage level to a baseline catalyst gas storage level; and determining that the catalyst is deteriorated in response to the baseline catalyst gas storage level exceeding the estimated gas storage level by a threshold difference.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-3, like numbering may represent like elements. Redundant explanation of these elements has been omitted for clarity. Finally, it is understood that the components of FIGS. 1-3 and their accompanying descriptions may be applied to any embodiment described herein.

DETAILED DESCRIPTION OF THE INVENTION

The subject matter disclosed herein relates generally to combustion engine catalysts. More specifically, the disclosure provided herein relates to detection of combustion engine catalyst deterioration.

As discussed above, conventional attempts to monitor combustion engine catalyst deterioration have strictly been based on comparing time lag between signals from upstream and downstream lambda sensors (oxygen sensors). As differentiated from conventional attempts, embodiments described herein estimate catalyst deterioration by analyzing gas levels from pre- and post-catalytic converter sensors. One conventional method is used for diagnosis of the catalytic activity based on the voltage output of the sensors. The greater the time difference in changes in voltage of the pre-cat and post-cat oxygen or lambda sensor signals, greater is the catalyst activity. Shorter time difference indicates catalyst deactivation.

Because replacement and maintenance of catalysts for internal combustion engines is costly and time consuming, embodiments of the invention allow for monitoring of catalyst deterioration and alteration of air flow ratios in order to use the catalyst after deterioration is detected instead of replacing the catalyst after a given amount of time.

Figure 1:
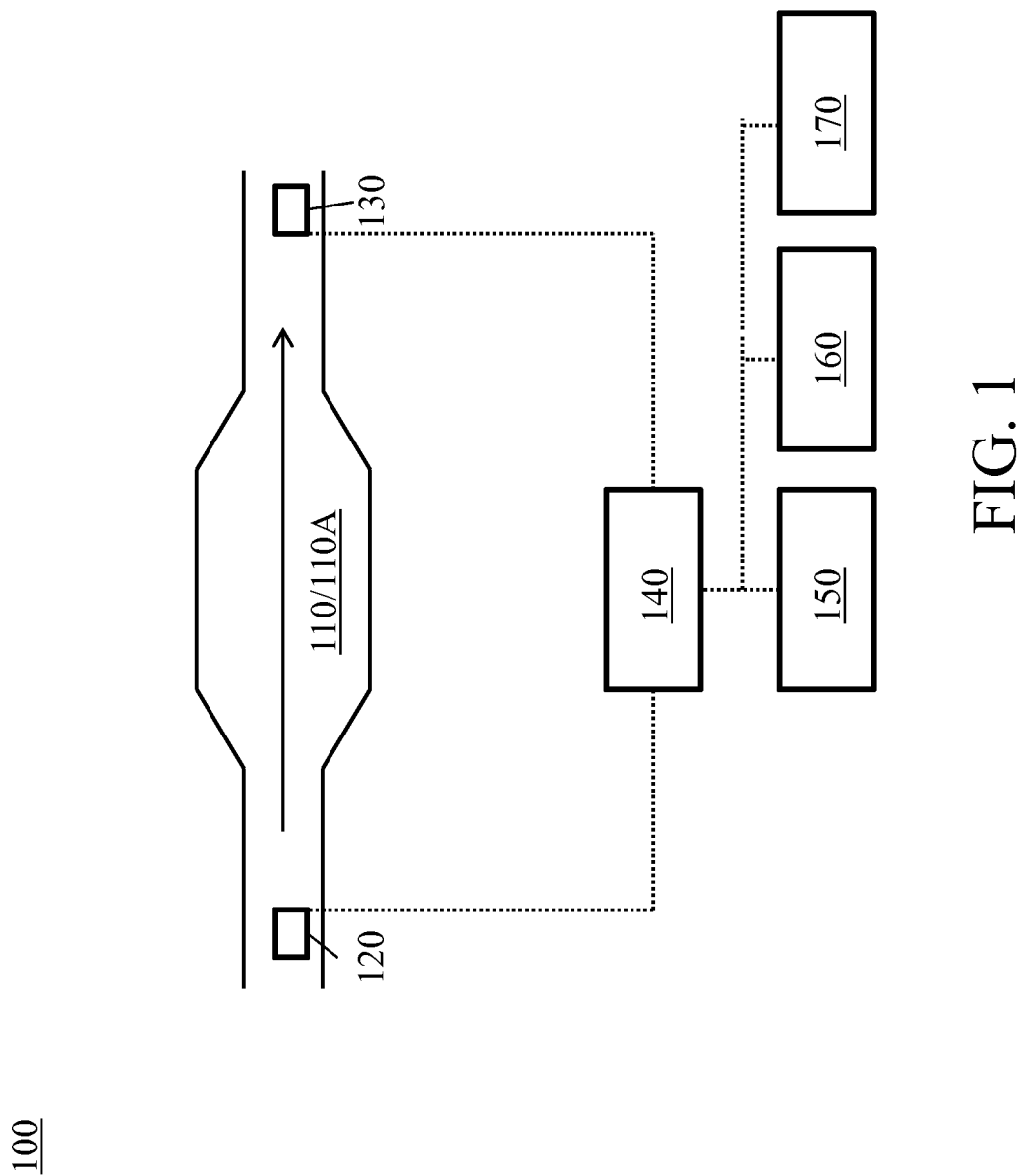
FIG. 1 illustrates a schematic drawing of a system according to various embodiments of the invention.

Turning to FIG. 1, a schematic drawing illustrating a system according to various aspects of the invention is shown. System 100 includes a catalytic converter 110 for positioning within an exhaust path of an internal combustion engine. Catalytic converter 110 may be a three-way catalyst (TWC) catalytic converter or a two-way catalytic converter. A two-way catalytic converter may be used in embodiments using a selective catalytic reduction (SCR) catalyst-based catalytic converter, (for example in comparing ammonia (NH3) storage profiles instead of oxygen storage).

System 100 includes catalytic converter 100, which in turn includes a catalyst 110A. System 100 further includes pre- and post-catalytic converter gas sensors, 120 and 130, respectively. According to aspects of the invention, such sensors may include an oxygen sensor, a nitrogen oxide (NOx) sensor, or both and a post-catalytic converter gas sensor may include an NH3 sensor. Pre-catalytic converter gas sensor 120 may be disposed within a flow of exhaust from an internal combustion engine, upstream of catalytic converter 110. The direction of exhaust flow is designated by an arrow in FIG. 1 (the internal combustion engine is not shown). Post catalytic converter gas sensor 130 may be disposed within the flow of the exhaust and downstream of catalytic converter 110.

System 100 further includes at least one computing device 140 communicatively coupled with pre-catalytic converter gas sensor 120 and post-catalytic converter gas sensor 130. The at least one computing device 140 may be configured to monitor catalyst deterioration by methods described herein. System 100 may include an engine control unit (ECU) 150, the function of which is described herein below. In embodiments where system 100 includes a TWC system, system 100 may include a model-based air fuel ratio (A/F) control system 160 and in embodiments where system 100 includes an SCR catalytic converter system, system 100 may include a model-based urea injection control system 170. Urea injection control system may adapt the flow rate of urea when the system detects catalyst degradation similar to the way the A/F control system adapts the A/F ratio when the system detects TWC degradation.

Figure 2:
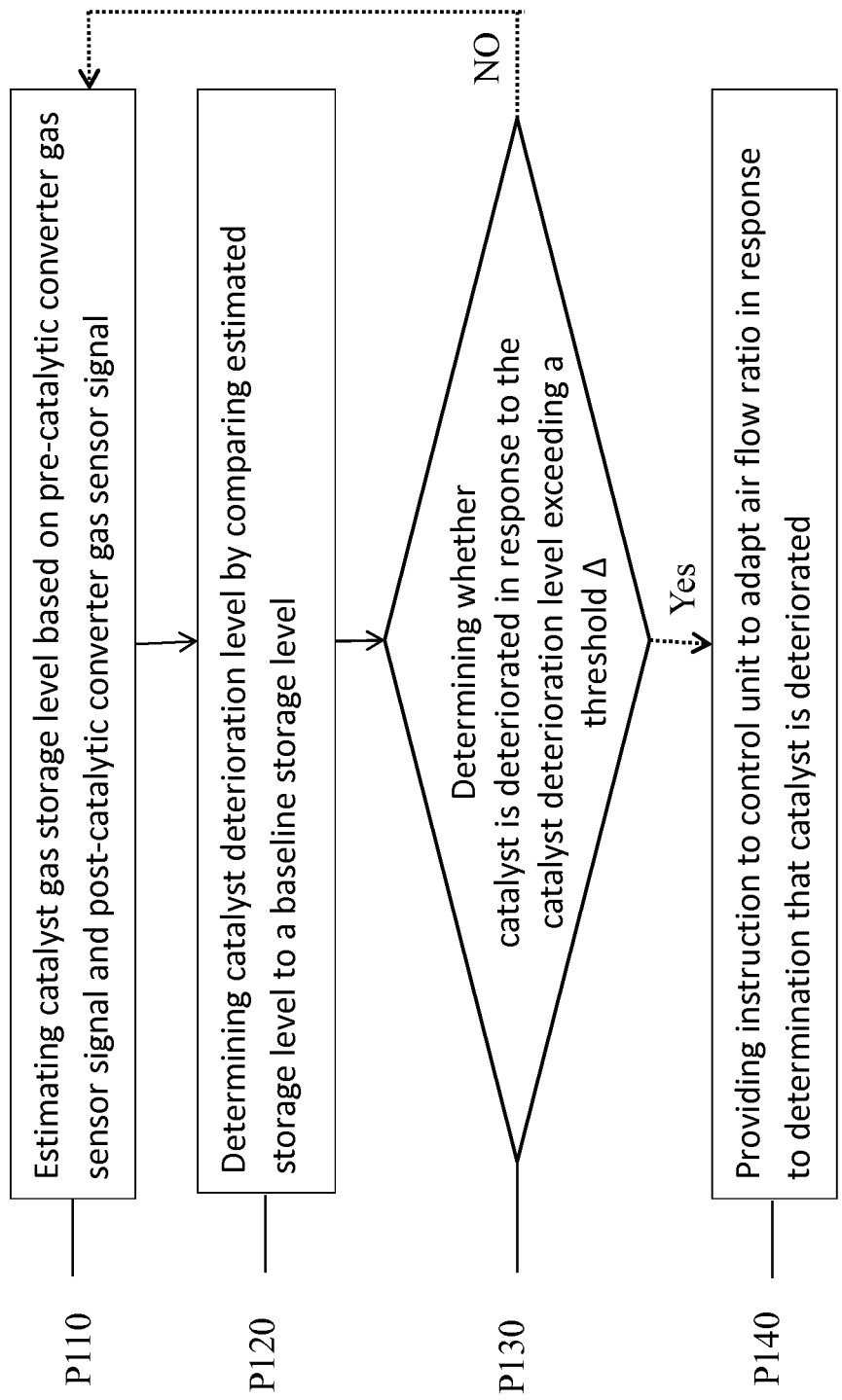
FIG. 2 illustrates a flow diagram illustrating a method according to various embodiments of the invention.

FIG. 2 illustrates a flow diagram illustrating a method according to various embodiments of the invention. FIG. 2 illustrates process which may be performed by at least one computing device 140 configured to monitor catalyst deterioration. Such processes include: process P110, which includes estimating a catalyst gas storage level by comparing a difference between a pre-catalytic converter gas level and a post-catalytic converter gas level. Pre-catalytic converter gas level may be detected by the pre-catalytic converter gas sensor 120 and sent via a signal from pre-catalytic converter gas sensor 120, while post-catalytic converter gas level may be detected by the post-catalytic converter gas sensor 130 sent via a signal from post-catalytic converter gas sensor 130. The gases sensed may include oxygen, nitrogen oxide (NOx), and or ammonia (NH3).

In the case of the gas being oxygen, lambda sensors may be used. Lambda sensors produce a varying voltage based on an amount of unburned oxygen in exhaust compared to the amount of oxygen in the outside air. The greater the difference, the greater the output voltage. Catalyst oxygen storage level may be estimated based on the difference between the voltage outputs of the pre- and post-catalytic converter gas sensors 120/130. Other sensors that may be used to detect gas levels include diode laser based sensors. In the case of the detected gases including nitrogen oxide (NOx, which may include NO or NO2), an estimation of ammonia storage estimation based on NOx sensor signals in SCR systems may be analyzed rather than oxygen storage estimation based on oxygen sensor signals. SCR systems typically inject urea into the exhaust stream ahead of a $NO_x$ reduction catalyst. A molecule of urea forms two molecules of ammonia after urea thermolysis and hydrolysis. Ammonia than reacts with NOx in the exhaust to form nitrogen and water. However if urea control is not precise, it could result in higher NH3 slip and/or lesser NOx conversion. Typically, NOx or NH3 sensor measurements at SCR in and SCR out are needed to estimate NH3 storage in the SCR catalyst. In some instances, for example when you have a DOC (diesel oxidation catalyst)-SCR or DOC-DPF (diesel particulate filter)-SCR system, a NOx sensor is placed at engine out and math models of DOC and DPF are used to estimate individual NO and NO2 concentrations at SCR inlet based on engine out NOx sensor reading. In such scenarios, NOx sensor at engine out and NOx sensor at SCR out are typically used to estimate NH3 storage in the SCR catalyst.

Process P120 includes determining a catalyst deterioration level by comparing the estimated catalyst gas storage level to a baseline catalyst gas storage level. Baseline catalyst gas storage level may be a gas storage level of a fresh, new unused or lightly used catalyst. Furthermore, baseline catalyst gas storage level may be a gas storage level of a degreened. By degreened, it is meant that the catalyst is aged for a relatively short time. Such comparisons may be performed in real time.

Process P130 includes determining that the catalyst is deteriorated in response to the baseline catalyst gas storage level exceeding the estimated gas storage level by a threshold difference. The threshold difference may be exceeded in cases where there is a ten percent (or greater) difference between the baseline gas storage level and the estimated catalyst gas storage level. The threshold difference may be higher or lower than ten percent, for example, five or fifteen percent. Further, the threshold difference may be a given percent, plus or minus a standard of error, for example one or two percent. If the threshold difference is exceeded, a fault may be detected by the at least one computing device and a fault warning may be sent to an interface, e.g. input/output component interface 208, shown in FIG. 3. The interface may provide an audio or visual signal to a human operator or system in order to alert the operator or the system of the fault. Alternatively, the fault warning may be simply stored in a memory for later retrieval or analysis. Whether the deterioration threshold difference is exceeded may be determined using decision making algorithms. Decision making algorithms could be either statistical or stochastic. For example, Bayesian decision theory could be used to make a decision if in fact the catalyst is aged.

If no fault is detected, or if catalyst deterioration is not detected after process P130, the processes P110-P120 may be repeated in a loop. Process P110 may be performed continuously, or after intervals of time. In cases where the catalyst deterioration level exceeds the threshold difference, a signal may be sent to an interface such as input/output component 208, to alert a user that the catalyst is due to be replaced.

FIG. 2 further illustrates optional process P140 which may be performed after processes P110-P130 in response to a determination that the catalyst is deteriorated. Process P140 includes providing an instruction to a control unit to adapt an air flow ratio in response to the determination that the catalyst is deteriorated. The instruction may be based on a calculation to determine a proper air flow (A/F) correction. The control unit may be an engine control unit (ECU). Adapting the-air fuel ratio may be accomplished through applying a 'correction' term that addresses the loss in catalyst sites due to catalyst aging or poisoning. Typically, the air-fuel ratio is considered ideal when that air volume drawn into the engine equivalent to the air volume theoretically required to burn the fuel injected into the engine. An ECU 150 may control A/F such that air and fuel are introduced to the engine (or to each cylinder, individually) in the ideal ratio. While replacement of the catalyst may be performed in response to the deterioration level exceeding a threshold difference, such replacement may not be immediately practicable and the engine using the catalyst may need to be kept in operation prior to such replacement. In such a case, A/F correction of process P140 may be available.

According to embodiments of the invention the system may be a three-way catalytic converter (TWC) system for use with a TWC. According to some such embodiments, the pre-catalytic converter gas sensor may includes an oxygen sensor and the post-catalytic converter gas sensor includes an oxygen sensor and the pre-catalytic converter gas level includes a pre-catalytic converter oxygen level, the post-catalytic converter gas level includes a post-catalytic converter oxygen level, the estimated catalyst gas storage level includes an estimated catalyst oxygen storage level, and the baseline catalyst gas storage level includes a baseline catalyst oxygen storage level. According to such embodiments, a decision regarding catalyst deterioration may be made based on oxygen storage as described above with respect to catalyst gas storage. The catalyst may be considered deteriorated if either of the oxygen storage level exceeds respective threshold differences.

According to some embodiments of the invention which employ a TWC system, the at lease one computing device may be further configured to perform actions including estimating a carbon monoxide (CO) emissions level based on the estimated catalyst oxygen storage level. Also according to such embodiments of the invention, the determining that the catalyst is deteriorated is performed in response to both the reference catalyst oxygen storage level exceeding the baseline catalyst oxygen storage level by a threshold difference and the estimated CO emissions level exceeding a reference CO emissions level by a second threshold difference.

According to embodiments, relevant data may be sent to and recorded by an ECU 150, or such data may be recorded by any appropriate data storage component. Such data may be sent to a model-based A/F control system with an oxygen storage estimator and a control strategy. The estimator or observer is typically a math-based model that estimates the un-measurable quantities using measured signals. The estimated quantity, which in this case is oxygen storage, is calculated based on the pre-catalytic converter and post-catalytic converter oxygen (lambda) sensor signals. This information may then be used to calculate an A/F command using a control algorithm. It should be understood that embodiments may estimate quantities other than oxygen storage.

The systems and processes according to embodiments may be adopted for selective catalytic reduction (SCR) applications. For example an estimation of ammonia storage estimation based on NOx sensor signals in SCR systems may be analyzed rather than oxygen storage estimation based on oxygen sensor signals. For non-limiting example, such systems may be used along with Jenbacher and GE Transportation platforms. In relation to such platforms, decision making algorithms and controls adaptation may remain the same. The decision making algorithms and controls adaptation techniques may be applicable for diagnosis of any catalytic or engine subsystem.

Embodiments which employ an SCR system may include a model-based urea injection control system. According to such embodiments, the pre- and post-catalytic converter gas sensors may include nitrogen oxide (NOx) sensors. Furthermore, the pre-catalytic converter gas level may include a pre-catalytic converter NOx level and the post-catalytic converter gas level may include a post-catalytic converter NOx level. The estimated catalyst gas storage level may include an estimated catalyst NOx storage level and the baseline catalyst gas storage level includes a baseline catalyst NOx storage level. In such embodiments, the at least one computing device may be further configured to perform actions including estimating a catalyst ammonia (NH3) storage level by analyzing the pre-catalytic converter NOx level and the post-catalytic converter NOx level and determining a NOx emission level by comparing the pre-catalytic converter NOx level to the post-catalytic converter NOx level. The estimating of the catalyst NH3 storage level may be performed using mathematical models for the SCR catalyst. It should be noted that in a system that uses pre- and post-catalytic converter NOx sensors, compensation for NH3 cross-sensitivity should be performed. $NH_3$ cross sensitivity for $NO_x$ sensors can be compensated through signal filtering techniques such as Kalman Filters or using other signal processing techniques. In such embodiments employing an SCR system the determining that the catalyst is deteriorated may performed in response to both the determined catalyst NOx emissions exceeding the baseline NOx emissions level by a threshold difference and a baseline catalyst NH3 storage level exceeding the estimated catalyst NH3 storage level by a second threshold difference. The baseline NOx emissions level may be read from a map or from a correlation table for an appropriate fresh or a degreened catalyst. It should be noted that according to the embodiment just described, the NOx level is sensed (or detected), rather than estimated.

According to yet other embodiments which employ SCR systems, pre- and post-catalytic converter NH3 sensors may be used to estimate NOx emissions. According to some such systems, a model-based urea injection control system may be included; the operation of such urea injection control is described herein above and will not be repeated for the sake of brevity. According to such SCR-system-based embodiments, the pre-catalytic converter gas sensor includes an ammonia (NH3) sensor and the post-catalytic converter gas sensor includes an NH3 sensor. The pre-catalytic converter gas level includes a pre-catalytic converter NH3 level and the post-catalytic converter gas level includes a post-catalytic converter NH3 level. The estimated catalyst gas storage level includes an estimated catalyst NH3 storage level and the baseline catalyst gas storage level includes a baseline catalyst NH3 storage level. According to such embodiments, the at least one computing device is further configured to perform actions including estimating a NOx emissions level by analyzing the pre-catalytic converter NH3 level and the post-catalytic converter NH3 level and estimating an NH3 storage level by comparing the pre-catalytic converter NH3 level with the post-catalytic converter NH3 level. Also according to such embodiments, the determining that the catalyst is deteriorated is performed in response to both the estimated NOx emissions level exceeding the baseline catalyst NOx storage level by a threshold difference and a baseline catalyst NH3 storage level exceeding the estimated catalyst NH3 storage level by a second threshold difference.

Other embodiments which employ SCR-based systems may incorporate pre- and post-catalytic converter NOx sensors along with a post-catalytic converter NH3 sensor. Such embodiments may be used when filtering out NH3 is difficult, or impossible. According to such embodiments, the system may include a model-based urea injection control system. In contrast to the generic gas-based sensor systems described above, in such SCR-based embodiments the pre-catalytic converter gas level includes a pre-catalytic converter NOx level and the post-catalytic converter gas level includes a post-catalytic converter NOx level and a post-catalytic converter NH3 level. The estimated catalyst gas storage level includes an estimated catalyst NOx storage level. The estimation of the NOx level is performed using at least one mathematical model appropriate for the SCR catalyst used. The estimator or observer may be a reduced order or control-oriented, zero dimensional SCR model which captures the relevant physics associated with the SCR catalyst such as chemical kinetics, mass transfer and heat transfer. Typical model based observers or estimators include the calculation of species concentrations, temperature and $NH_3$ storage level in the catalyst. According to such embodiments, the baseline catalyst gas storage level includes a baseline catalyst NOx storage level and a baseline catalyst NH3 storage level. The baseline catalyst NOx storage level may be a storage level for a fresh or degreened catalyst, as discussed above. And the at least one computing device may be further configured to perform actions including estimating a catalyst ammonia (NH3) storage level by analyzing the pre-catalytic converter NOx level, the post-catalytic converter NOx level and the post-catalytic converter NH3 level. Such estimation may be performed using appropriate mathematical models. And according to such embodiments, the determining that the catalyst is deteriorated is performed in response to both the estimated catalyst NOx storage level exceeding the baseline catalyst NOx storage level by a threshold difference and a baseline catalyst NH3 storage level exceeding the estimated catalyst NH3 storage level by a second threshold difference.

Figure 3:
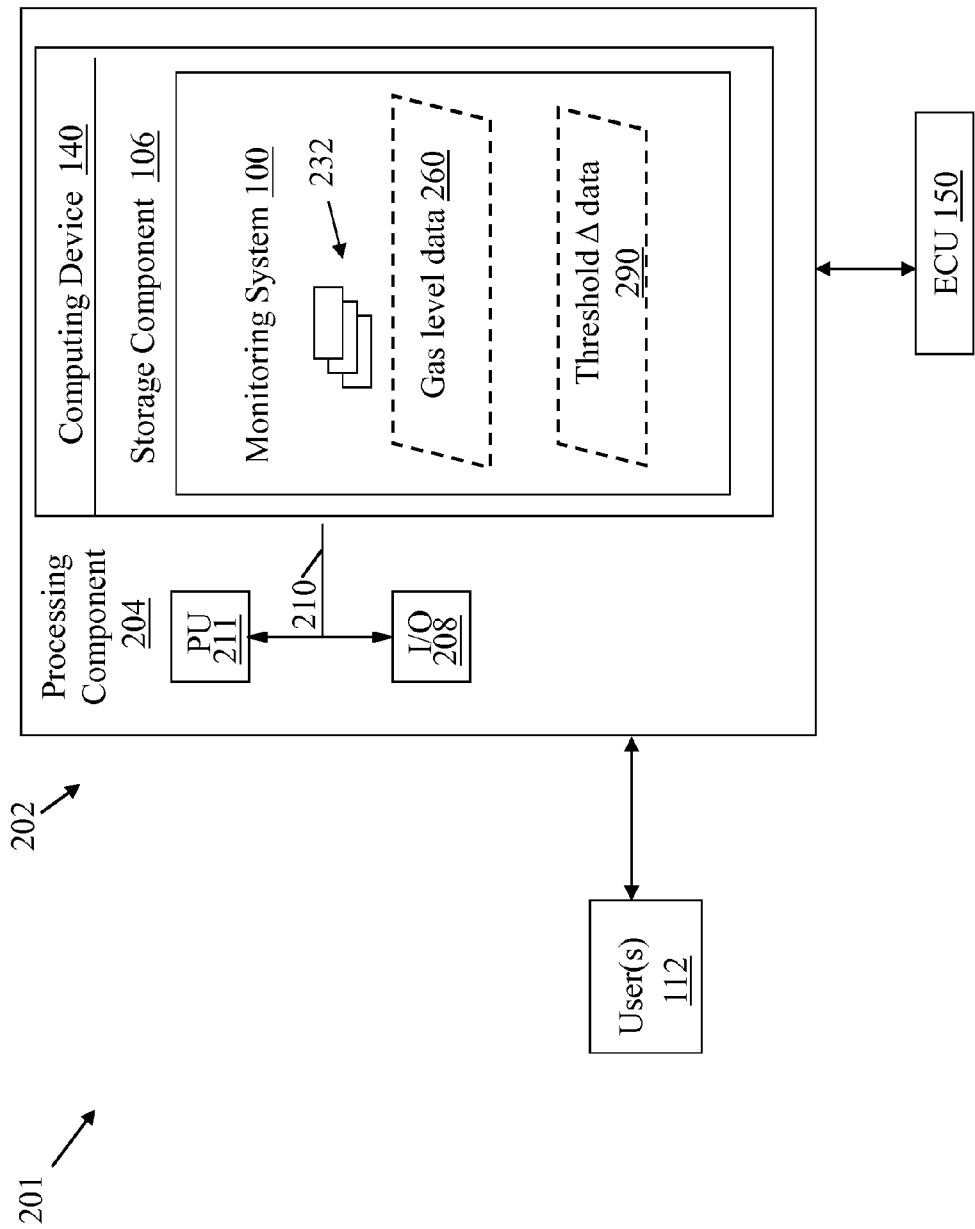
FIG. 3 shows an environment including a system according to various embodiments of the invention.

FIG. 3 shows an illustrative environment 201 including monitoring system 100, for performing the functions described herein according to various embodiments of the invention. To this extent, the environment 201 includes a computer system 202 that can perform one or more processes described herein in order to catalyst deterioration. Aspects of the invention include a computer program product including program code embodied in a computer readable storage medium, which when executed by at least one computing device, causes the at least one computing device to monitor catalyst deterioration by the methods and processes described herein. In particular, the computer system 202 is shown as including monitoring system 100, which makes computer system 202 operable to monitor catalyst deterioration by performing some/any/all of the processes described herein and implementing any/all of the embodiments described herein.

The computer system 202 is shown including a computing device 224, which can include a processing component 204 (e.g., one or more processors, or processing units (PUs) 211), a storage component 206 (e.g., a storage hierarchy), an input/output (I/O) component 208 (e.g., one or more I/O interfaces and/or devices), and a communications pathway 210. In general, the processing component 204 executes program code, such as that code used by monitoring system 100, which may be at least partially fixed in storage component 206. While executing program code, processing component 204 can process data, which can result in reading and/or writing transformed data from/to storage component 206 and/or I/O component 208 for further processing. Storage component and processing component may be integral to ECU 150 (not shown), or they may be in communication with ECU 150 (shown in FIG. 3). pathway 210 provides a communications link between each of the components in the computer system 202. I/O component 208 can comprise one or more human I/O devices, which enable user (e.g., a human and/or computerized user) 212 to interact with computer system 202 and/or one or more communications devices to enable system user 212 to communicate with computer system 202 using any type of communications link. To this extent, monitoring system 100 can manage a set of interfaces (e.g., graphical user interface(s), application program interface, etc.) that enable human and/or system users 212 to interact with monitoring system 100. Further, monitoring system 100 can manage (e.g., store, retrieve, create, manipulate, organize, present, etc.) data, such as gas level data 260 and/or threshold difference data 290 (e.g., data about one or more threshold differences, e.g., catalyst deterioration threshold difference(s).

In any event, computer system 202 may comprise one or more general purpose computing articles of manufacture (e.g., computing devices), specifically programmed for executing program code, such as monitoring system 100, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, monitoring system 100 can be embodied as any combination of system software and/or application software. It is further understood that monitoring system 100 may be implemented in a cloud-based computing environment, where one or more processes are performed at distinct computing devices (e.g., a plurality of computing devices 224), where one or more of those distinct computing devices may contain only some of the components shown and described with respect to the computing device 224 of FIG. 3.

Further, monitoring system 100 may be implemented using a set of modules 232. In this case, module 232 may enable computer system 202 to perform a set of tasks used by monitoring system 100, and may be separately developed and/or implemented apart from other portions of monitoring system 100. As used herein, the term "component" means any configuration of hardware, with or without software, which implements the functionality described in conjunction therewith using any solution, while the term "module" means program code that enables computer system 202 to implement the functionality described in conjunction therewith using any solution. When fixed in storage component 206 of a computer system 202 that includes processing component 204, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computer system 202.

When computer system 202 comprises multiple computing devices, each computing device may have only a portion of monitoring system 100 fixed thereon (e.g., one or more modules 232). However, it is understood that computer system 202 and monitoring system 100 are only representative of various possible equivalent computer systems that may perform a process described herein. To this extent, in other embodiments, the functionality provided by computer system 102 and monitoring system 100 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 202 includes multiple computing devices 224, the computing devices can communicate over any type of communications link. Further, while performing a process described herein, computer system 202 may communicate with one or more other computer systems using any type of communications link. In either case, the communications link can comprise any combination of various types of wired and/or wireless links; comprise any combination of one or more types of networks; and/or utilize any combination of various types of transmission techniques and protocols.

Computer system 202 can obtain or provide data, such as gas level data 260 and/or threshold difference data 290 using any solution. Computer system 202 may: generate gas level data 260 and/or threshold difference data 290 from one or more data stores; receive gas level data 260 and/or threshold difference data 290 from another system such as detection system 150 and/or user 212; and send gas level data 260 and/or threshold difference data 290 to another system, etc.

While shown and described herein as a method and system for monitoring catalyst deterioration, it is understood that aspects of the invention further provide various alternative embodiments. For example, in one embodiment, the invention provides a computer program fixed in at least one computer-readable medium, which when executed, enables a computer system to monitor catalyst deterioration. To this extent, the computer-readable medium includes program code, such as the monitoring system 100 (FIGS. 1 and 3), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture one or more memory/storage components of a computing device, paper, etc.

In another embodiment, the invention provides a method of providing a copy of program code, such as the monitoring system 100 (FIGS. 1 and 3), which implements some or all of a process described herein. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals may be transmitted/received using any type of communications link.

In any case, the technical effect of the various embodiments of the invention, including, e.g., the monitoring system 100, is to monitor deterioration of a catalyst in an engine.

Computing device 140 may comprise one or more general purpose computing articles of manufacture capable of executing program code, such that encoded with the method processes described with reference to FIGS. 1 and 2, installed thereon. When computing device 140 comprises multiple computing devices, each computing device may have only a portion of a program fixed thereon (e.g., one or more modules). However, it is understood that computing device 140 and any program for carrying out methods described herein are only representative of various possible equivalent computer systems that may perform a process described herein. To this extent, in other embodiments, the functionality provided by computing device 140 and programs encoding methods described herein can be at least partially implemented by one or more computing devices that include any combination of general and/or specific purpose hardware with or without program code, including but not limited to detection of catalyst degradation states as discussed herein. In each embodiment, the hardware and program code, if included, can be created using standard engineering and programming techniques, respectively.

When computing device 140 includes multiple computing devices, the computing devices can communicate over any type of communications link. Further, while performing a process described herein, computing device 140 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A catalyst deterioration detection system comprising:
   a pre-catalytic converter gas sensor;
   a post-catalytic converter gas sensor;
   at least one computing device in communication with the pre-catalytic converter and post-catalytic converter gas sensors, the at least one computing device programmed to monitor catalyst deterioration by performing actions including:
      estimating a catalyst gas storage level by comparing a difference between a pre-catalytic converter gas level from the pre-catalytic converter gas sensor and a post-catalytic converter gas level from the post-catalytic converter gas sensor;
      comparing the estimated catalyst gas storage level to a baseline catalyst gas storage level; and
      determining that the catalyst is deteriorated in response to the baseline catalyst gas storage level exceeding the estimated gas storage level by a threshold difference.

2. The catalyst deterioration detection system of claim 1, further comprising:
   a fault indicator designed to signal that the catalyst is deteriorated in response to the determining that the catalyst is deteriorated.

3. The catalyst deterioration detection system of claim 1, wherein the catalyst deterioration detection system is a three-way catalytic converter system for use with a three-way catalytic converter,
   wherein the pre-catalytic converter gas sensor includes an oxygen sensor and the post-catalytic converter gas sensor includes an oxygen sensor,
   wherein the pre-catalytic converter gas level includes a pre-catalytic converter oxygen level,
   wherein the post-catalytic converter gas level includes a post-catalytic converter oxygen level,
   wherein the estimated catalyst gas storage level includes an estimated catalyst oxygen storage level, and
   wherein the baseline catalyst gas storage level includes a baseline catalyst oxygen storage level.

4. The catalyst deterioration detection system of claim 3, wherein the at lease one computing device is further programmed to perform actions including:
   estimating a carbon monoxide (CO) emissions level based on the estimated catalyst oxygen storage level; and
   wherein the determining that the catalyst is deteriorated is performed in response to both the reference catalyst oxygen storage level exceeding the baseline catalyst oxygen storage level by a threshold difference and the estimated CO emissions level exceeding a reference CO emissions level by a second threshold difference.

5. The catalyst deterioration detection system of claim 1, wherein the threshold difference is exceeded when there is at least a ten percent difference between the baseline catalyst gas storage level and the estimated catalyst gas storage level.

6. The catalyst deterioration detection system of claim 1, wherein the baseline catalyst gas storage level is a catalyst gas storage level for one of a new catalyst or a degreened catalyst.

7. The catalyst deterioration detection system of claim 1, wherein the at least one computing device is further programmed to perform processes including:
   providing an instruction to a control unit to adapt an air flow ratio of an engine in response to a deviation in the catalyst deterioration level.

8. The catalyst deterioration detection system of claim 1, wherein the estimating of the catalyst gas storage level is performed over a period of time using a plurality of differences between respective pre-catalytic converter gas levels and post-catalytic converter gas level levels.

9. The catalyst deterioration detection system of claim 1, further comprising:
   a model-based urea injection control system,
   wherein the catalyst deterioration detection system is a selective catalytic reduction (SCR) catalytic converter system for use with an SCR catalytic converter,
   wherein the pre-catalytic converter gas sensor includes a nitrogen oxide (NOx) sensor and the post-catalytic converter gas sensor includes a NOx sensor,
   wherein the pre-catalytic converter gas level includes a pre-catalytic converter NOx level,
   and wherein the post-catalytic converter gas level includes a post-catalytic converter NOx level,
   wherein the estimated catalyst gas storage level includes an estimated catalyst NOx storage level, and
   wherein the baseline catalyst gas storage level includes a baseline catalyst NOx storage level; and
   wherein the at least one computing device is further programmed to perform actions including:
      estimating a catalyst ammonia (NH3) storage level by analyzing the pre-catalytic converter NOx level and the post-catalytic converter NOx level; and
      determining a NOx emission level by comparing the pre-catalytic converter NOx level to the post-catalytic converter NOx level,
   wherein the determining that the catalyst is deteriorated is performed in response to both the determined catalyst NOx emissions exceeding the baseline NOx emissions level by a threshold difference and a baseline catalyst NH3 storage level exceeding the estimated catalyst NH3 storage level by a second threshold difference.

10. The catalyst deterioration detection system of claim 1, further comprising:
    a model-based urea injection control system,
    wherein the catalyst deterioration detection system is a selective catalytic reduction (SCR) catalytic converter system for use with an SCR catalytic converter,
    wherein the pre-catalytic converter gas sensor includes an ammonia (NH3) sensor and the post-catalytic converter gas sensor includes an NH3 sensor,
    wherein the pre-catalytic converter gas level includes a pre-catalytic converter NH3 level,
    wherein the post-catalytic converter gas level includes a post-catalytic converter NH3 level,
    wherein the estimated catalyst gas storage level includes an estimated catalyst NH3 storage level,
    wherein the baseline catalyst gas storage level includes a baseline catalyst NH3 storage level, and
    wherein the at least one computing device is further programmed to perform actions including:
       estimating a NOx emissions level by analyzing the pre-catalytic converter NH3 level and the post-catalytic converter NH3 level,
       estimating an NH3 storage level by comparing the pre-catalytic converter NH3 level with the post-catalytic converter NH3 level, and wherein the determining that the catalyst is deteriorated is performed in response to both the estimated NOx emissions level exceeding the baseline catalyst NOx storage level by a threshold difference and a baseline catalyst NH3 storage level exceeding the estimated catalyst NH3 storage level by a second threshold difference.

11. The catalyst deterioration detection system of claim 1, further comprising:
a model-based urea injection control system,
wherein the catalyst deterioration detection system is a selective catalytic reduction (SCR) catalytic converter system for use with an SCR catalytic converter,
wherein the pre-catalytic converter gas sensor includes a nitrogen oxide (NOx) sensor and the post-catalytic converter gas sensor includes a NOx sensor and an ammonia (NH3) sensor,
wherein the pre-catalytic converter gas level includes a pre-catalytic converter NOx level,
wherein the post-catalytic converter gas level includes a post-catalytic converter NOx level and a post-catalytic converter NH3 level,
wherein the estimated catalyst gas storage level includes an estimated catalyst NOx storage level,
wherein the baseline catalyst gas storage level includes a baseline catalyst NOx storage level and a baseline catalyst NH3 storage level, and
wherein the at least one computing device is further programmed to perform actions including:
estimating a catalyst ammonia (NH3) storage level by analyzing the pre-catalytic converter NOx level, the post-catalytic converter NOx level and the post-catalytic converter NH3 level, and
wherein the determining that the catalyst is deteriorated is performed in response to both the estimated catalyst NOx storage level exceeding the baseline catalyst NOx storage level by a threshold difference and a baseline catalyst NH3 storage level exceeding the estimated catalyst NH3 storage level by a second threshold difference.

12. A catalyst deterioration detection system including a three-way catalytic converter system for use with a three-way catalytic converter, the catalyst deterioration detection system comprising:
a pre-catalytic converter gas sensor;
a post-catalytic converter gas sensor;
at least one computing device in communication with the pre-catalytic converter and post-catalytic converter gas sensors, the at least one computing device programmed to monitor catalyst deterioration by performing actions including:
estimating a catalyst gas storage level by comparing a difference between a pre-catalytic converter gas level from the pre-catalytic converter gas sensor and a post-catalytic converter gas level from the post-catalytic converter gas sensor, wherein the pre-catalytic converter gas level includes a pre-catalytic converter oxygen level, wherein the post-catalytic converter gas level includes a post-catalytic converter oxygen level, wherein the estimated catalyst gas storage level includes an estimated catalyst oxygen storage level;
comparing the estimated catalyst gas storage level to a baseline catalyst gas storage level, wherein the baseline catalyst gas storage level includes a baseline catalyst oxygen storage level;
determining that the catalyst is deteriorated in response to the baseline catalyst gas storage level exceeding the estimated gas s rage level by a threshold difference; and
estimating a carbon monoxide (CO) emissions level based on the estimated catalyst oxygen storage level; and
wherein the determining that the catalyst is deteriorated is performed in response to both the reference catalyst oxygen storage level exceeding the baseline catalyst oxygen storage level by a threshold difference and the estimated CO emissions level exceeding a reference CO emissions level by a second threshold difference.

13. A catalyst deterioration detection system comprising:
a pre-catalytic converter gas sensor;
a post-catalytic converter gas sensor;
at least one computing device in communication with the pre-catalytic converter and post-catalytic converter gas sensors, the at least one computing device programmed to monitor catalyst deterioration by performing actions including:
estimating a catalyst gas storage level by comparing a difference between a pre-catalytic converter gas level from the pre-catalytic converter gas sensor and a post-catalytic converter gas level from the post-catalytic converter gas sensor;
comparing the estimated catalyst gas storage level to a baseline catalyst gas storage level;
determining that the catalyst is deteriorated in response to the baseline catalyst gas storage level exceeding the estimated gas storage level by a threshold difference; and
providing an instruction to a control unit to adapt an air flow ratio of an engine in response to a deviation in the catalyst deterioration level.

* * * * *

UNITED STATES PATENT AND TRADEMARK OFFICE
CERTIFICATE OF CORRECTION

PATENT NO. : 9,435,246 B2
APPLICATION NO. : 14/083823
DATED : September 6, 2016
INVENTOR(S) : Devarakonda It is certified that error appears in the above-identified patent and that said Letters Patent is hereby corrected as shown below:

In the Drawings

In Fig. 3, Sheet 3 of 3, delete Tag "140" and insert Tag -- 224 --, therefor.

In Fig. 3, Sheet 3 of 3, delete Tag "106" and insert Tag -- 206 --, therefor.

In Fig. 3, Sheet 3 of 3, delete Tag "112" and insert Tag -- 212 --, therefor.

In the Specification

In Column 3, Line 27, delete "catalytic converter 100," and insert -- catalytic converter 110, --, therefor.

In Column 4, Line 4, delete "and or" and insert -- and/or --, therefor.

In Column 5, Line 49, delete "at lease" and insert -- at least --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*